(12) United States Patent
Kim et al.

(10) Patent No.: US 11,764,394 B2
(45) Date of Patent: Sep. 19, 2023

(54) BATTERY CELL AND MANUFACTURING METHOD THEREOF

(71) Applicant: SK INNOVATION CO., LTD., Seoul (KR)

(72) Inventors: Jin-Go Kim, Daejeon (KR); Dong-Ju Kim, Daejeon (KR); Seung-Noh Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 16/758,306

(22) PCT Filed: Mar. 25, 2019

(86) PCT No.: PCT/KR2019/003460
§ 371 (c)(1),
(2) Date: Apr. 22, 2020

(87) PCT Pub. No.: WO2019/190145
PCT Pub. Date: Oct. 3, 2019

(65) Prior Publication Data
US 2020/0343575 A1   Oct. 29, 2020

(30) Foreign Application Priority Data

Mar. 27, 2018  (KR) .................. 10-2018-0035346

(51) Int. Cl.
*C09J 5/06* (2006.01)
*C09J 175/04* (2006.01)
(Continued)

(52) U.S. Cl.
CPC ............. *H01M 10/049* (2013.01); *C09J 5/06* (2013.01); *C09J 175/04* (2013.01);
(Continued)

(58) Field of Classification Search
CPC ... H01M 50/183; H01M 50/19; H01M 50/105
See application file for complete search history.

(56) References Cited

U.S. PATENT DOCUMENTS

2010/0132885 A1* 6/2010 Schumann ......... C08G 18/4812
156/331.7
2011/0104483 A1   5/2011 Shinozaki et al.
(Continued)

FOREIGN PATENT DOCUMENTS

CN  102131639 A   7/2011
CN  102190973 A   9/2011
(Continued)

OTHER PUBLICATIONS

Machine translation of KR-2016-0077871A (Year: 2022).*
(Continued)

*Primary Examiner* — Niki Bakhtiari
*Assistant Examiner* — Grace Ann Kenlaw
(74) *Attorney, Agent, or Firm* — IP & T GROUP LLP

(57) ABSTRACT

A battery cell includes an electrode assembly; a case comprising an accommodation portion accommodating the electrode assembly and a sealing portion formed on a periphery of the accommodation portion; and a fixing member disposed between the accommodation portion and the sealing portion to adhere each other; wherein the fixing member comprises a core layer, and an adhesive layer is stacked on both surfaces of the core layer.

4 Claims, 6 Drawing Sheets

(51) Int. Cl.
    *H01M 50/121* (2021.01)
    *H01M 10/04* (2006.01)
    *H01M 50/105* (2021.01)
    *H01M 50/197* (2021.01)
    *H01M 50/136* (2021.01)

(52) U.S. Cl.
    CPC ....... *H01M 50/105* (2021.01); *H01M 50/121* (2021.01); *H01M 50/136* (2021.01); *H01M 50/197* (2021.01)

(56) References Cited

U.S. PATENT DOCUMENTS

| | | | |
|---|---|---|---|
| 2013/0015909 A1* | 1/2013 | Kim | G06F 3/041 327/517 |
| 2014/0220413 A1 | 8/2014 | Moon | |
| 2016/0315294 A1 | 10/2016 | Kim | |

FOREIGN PATENT DOCUMENTS

| | | |
|---|---|---|
| CN | 105295754 A | 2/2016 |
| CN | 105900274 A | 8/2016 |
| CN | 106032458 A | 10/2016 |
| KR | 10-2001-0017195 A | 3/2001 |
| KR | 10-2011-0111826 A | 10/2011 |
| KR | 10-2013-0100701 A | 9/2013 |
| KR | 10-2014-0061148 A | 5/2014 |
| KR | 10-2016-0077871 A | 7/2016 |
| KR | 10-2016-0080559 A | 7/2016 |

OTHER PUBLICATIONS

Office Action for the Chinese Patent Application No. 201980005888.9 issued by the Chinese Patent Office dated Jun. 23, 2022.

* cited by examiner

A-A'

'B'

BATTERY CELL AND MANUFACTURING METHOD THEREOF

This application is a national stage application of PCT/KR2019/003460 filed on

Mar. 25, 2019, which claims priority of Korean patent application number 10-2018-0035346 filed on Mar. 27, 2018. The disclosure of each of the foregoing applications is incorporated herein by reference in its entirety.

TECHNICAL FIELD

The present invention relates to a battery cell having a maximum internal space.

BACKGROUND ART

Lithium secondary batteries have an operating voltage of 3.6 V or higher and are used as a power source for portable electronic devices, or are used in high-power hybrid vehicles by connecting several thereof in series. Lithium secondary batteries have an operating voltage 3 times higher than nickel-cadmium batteries or nickel-metal hydride batteries, and have superior energy density per unit weight. In this regard, it is a current trend that use of lithium secondary batteries is rapidly increasing.

In general, lithium secondary batteries are manufactured in units of battery cells and may be divided into a can-type secondary battery, in which an electrode assembly is assembled in a metal can, and a pouch-type secondary lithium battery, in which an electrode assembly is assembled in a pouch of an aluminum laminate sheet.

The pouch-type secondary battery is manufactured through processes of introducing an electrolyte while the electrode assembly is accommodated in the exterior material and sealing the exterior material.

However, the conventional pouch-type secondary battery is sealed on three or four surfaces, and thus-resulting sealing portions inevitably create dead volume, in which electric energy is not generated.

In this regard, it is a major problem of the pouch-type secondary battery that a space percentage for which the sealing portions account needs to be minimized to maximize volumetric efficiency or a volumetric energy density.

Accordingly, there is a need for a battery cell capable of solving the above problems.

DISCLOSURE

Technical Problem

An aspect of the present invention may provide a battery cell capable of maximizing volumetric efficiency of a secondary battery by minimizing volume of a sealing portion of a pouch.

Technical Solution

According to an aspect of the present invention, a battery cell includes an electrode assembly; a case comprising an accommodation portion accommodating the electrode assembly and a sealing portion formed on a periphery of the accommodation portion; and a fixing member disposed between the accommodation portion and the sealing portion for adhesion thereof; wherein the fixing member includes a core layer, and an adhesive layer is stacked on both surfaces of the core layer.

In the example embodiment, the sealing portion is bent at least once to be adhered to the accommodation portion.

In the example embodiment, the core layer may be formed of a material having a lower elongation percentage, as compared to the adhesive layer.

In the example embodiment, the case may be formed of polyethylene terephthalate (PET), and the adhesive layer may be formed of a polyurethane-based resin.

In the example embodiment, the core layer may be formed of PET.

In the example embodiment, in the fixing member, a thickness of the adhesive layer may be greater than a thickness of the core layer.

In the example embodiment, a thickness of the fixing member may be formed to be 100 μm to 300 μm, and a thickness of the adhesive layer may be formed to be at least twice greater than a thickness of the core layer.

In the example embodiment, the fixing member may have an elongation percentage of 20% or less.

In the example embodiment, the fixing member may have a tensile strength of 30 $N/m^2$ or higher.

According to another aspect of the present invention, a method for manufacturing a battery cell includes disposing an electrode assembly in an accommodation portion of a case; bending a sealing portion of the case; adhering a fixing member to the sealing portion; and attaching the sealing portion to the accommodation portion via the fixing member, wherein the fixing member comprises a core layer and an adhesive layer stacked on both surfaces of the core layer.

In the example embodiment, the process of attaching the sealing portion to the accommodation portion may include melting and hardening the adhesive layer by thermocompressing the sealing portion.

In the example embodiment, the core layer may be formed of polyethylene terephthalate (PET), and the adhesive layer may be formed of a polyurethane-based resin.

In the example embodiment, the process of attaching the fixing member to the sealing portion may include removing a release liner attached to the fixing member to expose one surface of the fixing member having adhesiveness; and attaching the one surface of the fixing member to the sealing portion.

Advantageous Effects

As set forth above, according to example embodiments of the present invention, a battery cell and a manufacturing method thereof can maximize volumetric efficiency of the battery cell by bending and adhering a sealing portion of a pouch.

In addition, as a fixing member, in which adhesive layers are disposed on both surfaces of a core layer, is used to adhere the sealing portion and an accommodation portion, a deformation of the fixing member can be minimized during a process of adhesion of the fixing member to the sealing portion, and excessive diffusion of melted adhesive layers can be prevented during thermocompression. In this regard, adhesion reliability of the sealing portion and the accommodation portion can be enhanced, and insulation failure, which may be critical to the battery cell, can be prevented during the manufacturing of the battery cell.

BRIEF DESCRIPTIONS OF THE DRAWINGS

MODE FOR INVENTION

Figure 1:
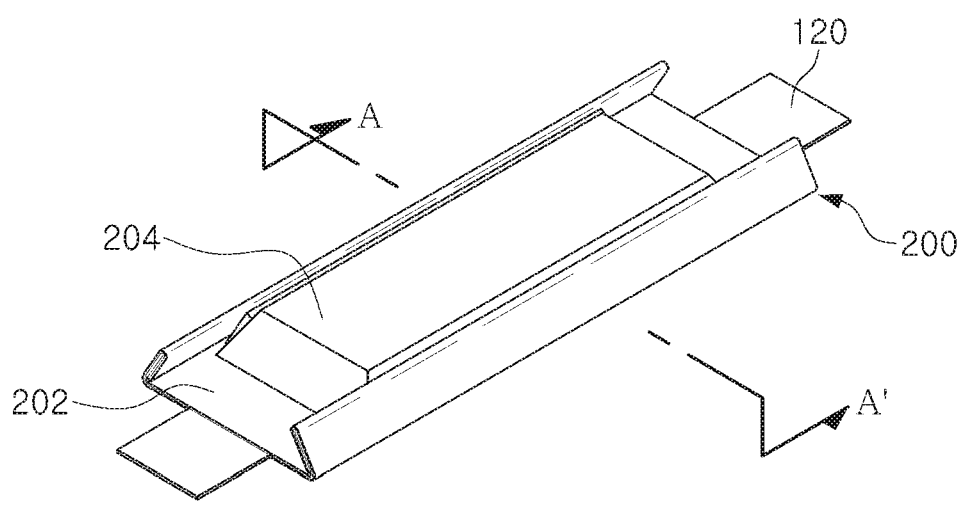
FIG. 1 is a perspective view illustrating a battery cell according to the example embodiment of the present invention.

Hereinafter, embodiments of the present invention will be described with reference to schematic views illustrating embodiments of the present invention. In the drawings, for example, due to manufacturing techniques and/or tolerances, modifications of the shape shown may be estimated. Thus, embodiments of the present invention should not be construed as being limited to the particular shapes of regions shown herein, for example, to include a change in shape results in manufacturing. The following embodiments may also be constituted by one or a combination thereof.

Figure 2:
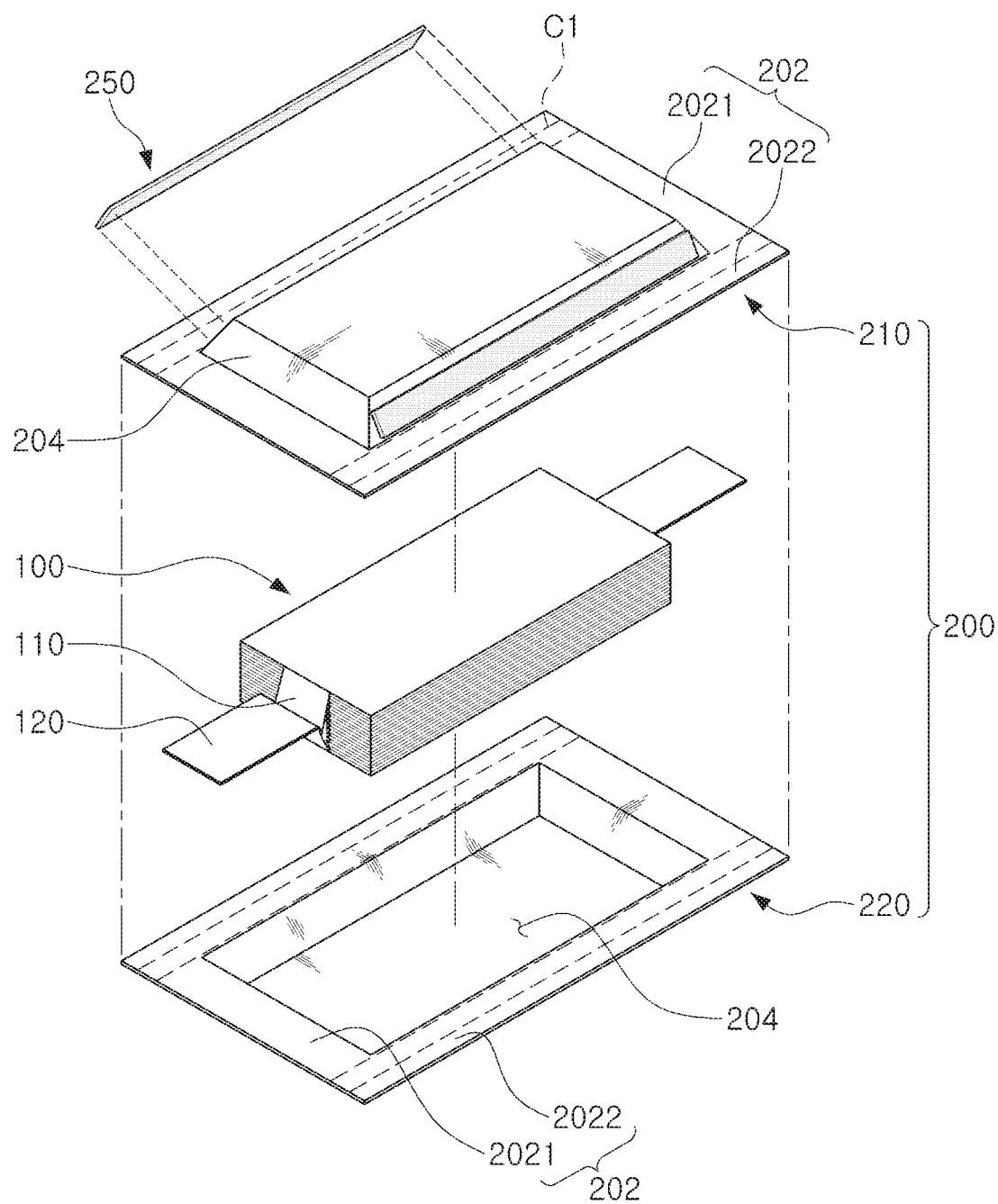
FIG. 2 is an exploded perspective view of the battery cell illustrated in FIG. 1.
Figure 3:
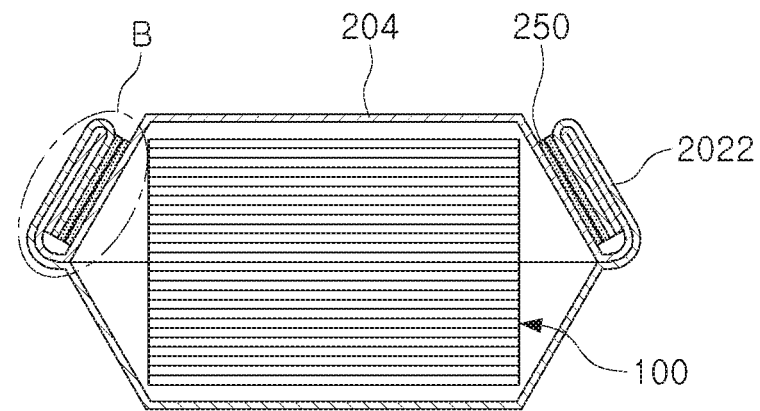
FIG. 3 is a cross-sectional view taken along line I-I' of FIG. 2.
Figure 4:
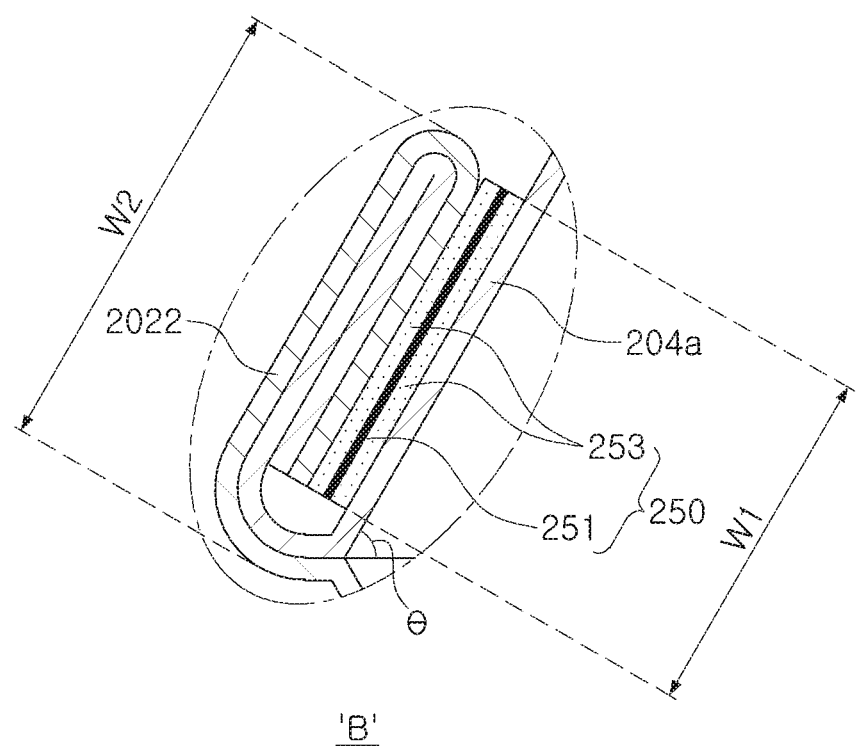
FIG. 4 is an enlarged view of "B" of FIG. 3.

FIG. 1 is a perspective view illustrating a battery cell according to the example embodiment of the present invention, and FIG. 2 is an exploded perspective view of the battery cell illustrated in FIG. 1. FIG. 3 is a cross-sectional view taken along line I-I' of FIG. 2, and FIG. 4 is an enlarged view of "B" of FIG. 3. FIG. 2 illustrates a second sealing portion, which is unbent, for convenience of description.

Based on FIGS. 1 to 4, a pouch-type battery cell according to the present invention includes an electrode assembly 100 and a pouch-type case 200.

The electrode assembly 100 is provided with a plurality of electrode plates and electrode taps 110 and is accommodated in an accommodation portion 204 of the case 200. The electrode plates consist of an anode plate and a cathode plate. The electrode assembly 100 may be in the form of a stacked structure in which relatively wide surfaces of the anode plate and the cathode plate face each other, with a separator interposed therebetween.

The anode plate and the cathode plate may be formed to have a structure in which a current collector is coated with an active material slurry. Conventionally, the slurry may be formed in such a manner that a granular active material, an auxiliary conductor, a binder, a plasticizer, or the like, to which a solvent is added, is stirred.

Further, the electrode assembly 100 may include a plurality of anode plates and a plurality of cathode plates, stacked in a vertical direction. In this case, each of a plurality of the anode plates and a plurality of the cathode plates may include the electrode tap 110 and may be in contact with a different electrode tap 110 having the same polarity and connected to an electrode lead 120 having the same polarity.

The case 200 may include a first case 210 and a second case 220. Each of the first case 210 and the second case 220 may include a sealing portion 202 and the accommodation portion 204.

The accommodation portion 204 is formed to have a container shape to provide an internal space. The sealing portion 202 is formed to have a flange shape extending at an inlet of the accommodation portion 204.

The electrode assembly 100 and an electrolyte (not illustrated) are accommodated in the internal space of the accommodation portion 204. As illustrated in FIG. 2, the accommodation portion is formed in an entirety of the first case 210 and the second case 220, but may be formed in only one of the cases if necessary.

The sealing portion 202 may be disposed as an edge portion along a perimeter of the accommodation portion 204.

The sealing portion 202 of the first case 210 and the sealing portion 202 of the second case 220 may be bonded to each other, thereby sealing the internal space formed by the accommodation portion 204.

The bonding between the sealing portions 202 may be carried out by a heat fusion method, but is not limited thereto.

The sealing portion 202 may be divided into a first sealing portion 2021 in which an electrode lead 120 is disposed and a second sealing portion in which the electrode lead 120 is not disposed. In the example embodiment, the accommodation portion 204 is formed to have a rectangular shape, and the sealing portion 202 is disposed in a periphery of the rectangular shape. Accordingly, four sealing portions 202 are provided.

Further in the example embodiment, as the electrode leads 120 are disposed to face opposite directions, the two electrode leads 120 are disposed in a different sealing portion 202. In this regard, the first sealing portion 2021 includes two electrode leads 120 and the second sealing portion 2022 includes two electrode leads 2120.

However, the present invention is not limited thereto. In the case in which the two electrode leads 120 are disposed in a single sealing portion 202, the second sealing portion 2022 may include three electrode leads.

In addition, in order to significantly reduce an area of the sealing portions 202 while increasing adhesion reliability, the sealing portions 202 may be formed to have a form of being folded at least once.

More specifically, of ail sealing portions 202 according to the example embodiment, the second sealing portion 2022, in which the electrode lead 120 is not disposed, is bent twice and then fixed.

Figure 5:
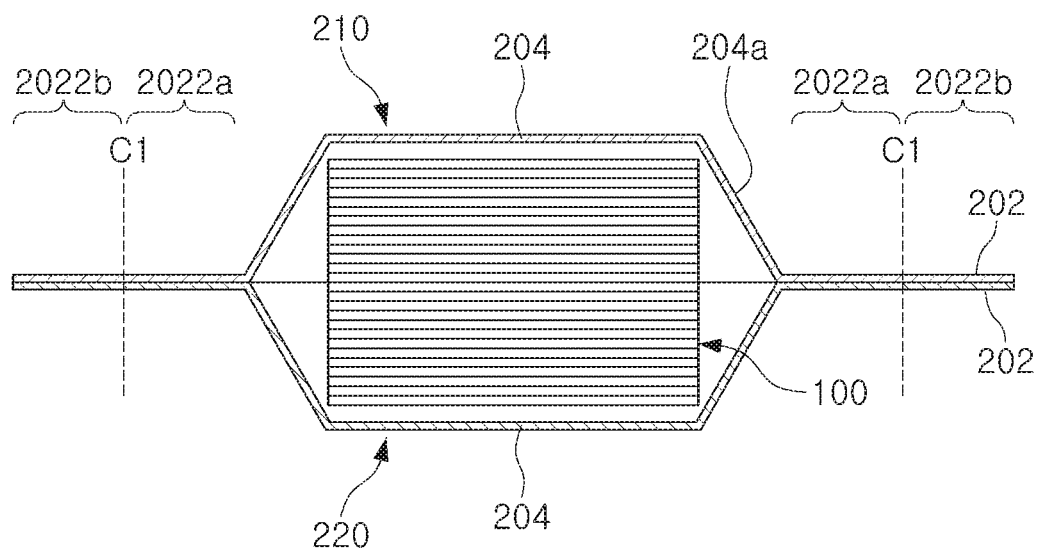
FIGS. 5 to 9 are diagrams illustrating a method for manufacturing a battery cell according to the example embodiment.
Figure 7:
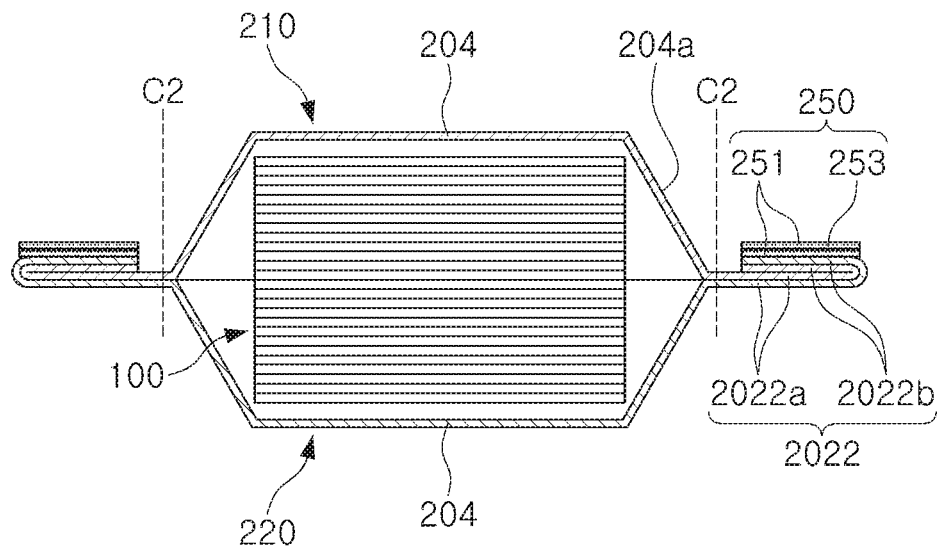

For example, the second sealing portion 2022 may be bent at 180° along a first fold line C1 illustrated in FIG. 5, followed by being bent along a second fold line C2 illustrated in FIG. 7, such that the second sealing portion 2022 is adhered to a side surface (204a of FIG. 4) of the accommodation portion 204. In this case, an angle, at which the sealing portion 202 is bent along the second fold line C2, may vary depending on an angle ($\theta$ of FIG. 4) of the side surface 204a of the accommodation portion.

Meanwhile, the angle $\theta$, at which the sealing portion 202 is bent along the second fold line C2, is less than 90° but may be equal to or greater than 75°.

When the angle $\theta$ is at least 90°, the sealing portion 202 is formed to bite into the accommodation portion 204, and thus can be in contact with the electrode assembly 100. When the angle is less than 75°, a dead volume increases inside the pouch, thereby making it difficulty to firmly fix the electrode assembly 100 in the accommodation portion 204 and causing a problem of reduced volumetric energy density.

Accordingly, in order to solve such problems, the angle $\theta$ is limited to being in the range of 75° to 90°.

Owing to such structure, the second sealing portion 2022 may have enhanced sealing as well as adhesion reliability.

Meanwhile, the sealing portion 202 bent along the second fold line is fixedly adhered to the side surface 204a of the accommodation portion via the fixing member 250.

The fixing member 250 in the example embodiment involves use of a film-shape or tape-shape member and is melted or hardened by a heat fusion method to adhere the sealing portion 202 and the accommodation portion 204 to each other.

The fixing member 250 contains a core layer 251 and adhesive layers 253 stacked on both surfaces of the core layer 251.

The core layer 251 prevents an excessive elongation percentage of the fixing member 250 during the process in which the fixing member 250 is attached to the sealing portion 202. The core layer 251 may be formed of a PET material, but is not limited thereto.

The core layer 251 is provided to limit an elongation percentage of the fixing member 250. As described below, the adhesive layer 253 formed of a polyurethane-based material has a significantly large elongation percentage. Accordingly, when the fixing member 250 is configured only with the adhesive layers 253, the fixing member 250 may be excessively extended during a process in which force is applied to the fixing member 250 to be attached to the sealing portion 202. In this case, a width of the fixing member 250 is reduced, which may lead to reduced adhesion of the fixing member 250. In addition, when the fixing member 250 has a low tensile strength, the fixing member 250 may easily break during the process in which the fixing member 250 is attached to the sealing portion 202.

Accordingly, in the example embodiment, the core layer 251 is positioned between the adhesive layers 253 to maintain the elongation percentage at 20% or below. To this end, the core layer 251 has a low elongation percentage and does not easily elongate compared to the adhesive layer 253, and is formed of a material (e.g., PET) which is not easily melted at a melting temperature of the adhesive layer 253.

Additionally, the core layer 251 prevents excessive diffusion of the melted adhesive layer when the adhesive layer 253 is melted during the manufacture of the battery cell. In the absence of the core layer 251, the entire fixing member 250 is melted, and the melted adhesive layer 253 is easily diffused externally. In this case, the diffused adhesive layer 253 may induce a defect.

In the case of the core layer 251 provided as in the example embodiment, the melted adhesive layer 253 can be prevented from being diffused as a surface tension is generated by the core layer 251. Accordingly, occurrence of defects due to the excessive diffusion of the adhesive layer 253 can be minimized.

The adhesive layer 253 stacked on both surfaces of the core layer 251 are adhered to the sealing portion 202 and the accommodation portion 204. A polyurethane-based resin, a polyolefin-base resin, a polyester-base resin, a polyamide-base resin, and the like, may be used as the adhesive layer 253.

In the example embodiment, a surface of the case 200 is formed of a PET material. Accordingly, in consideration of adhesion to PET, a polyurethane-based material is used for the adhesive layer 253.

However, when the surface of the case 200 is formed of other materials such as nylon, or the like, the adhesive layer 253 may be selectively formed of the previously described various resins.

As such fixing member 250 is formed to have a film or tape shape, the fixing member 250 may be excessively extended or break during the force application thereto to adhere to the sealing portion 202.

In this regard, the elongation percentage of the fixing member 250 is limited to 20% or below, and the tensile strength is limited to 30 N/m² or higher.

A 10 mm×120 mm-sized sample was measured with respect to tensile strength and elongation percentage at a target distance of 100 mm and a tensile speed of 100 mm/min. The elongation was measured to be 1 N/m² or less and the elongation percentage was measured to exceed 400% when the fixing member was formed only of PUR. This indicates that it is difficult to form the fixing member 250 of the present invention only of PUR.

In contrast, when the core layer 251 is provided between the adhesive layers 253 as in the example embodiment, the tensile strength of the fixing member 250 was measured to be 30 N/m² to 45 N/m² while the elongation percentage was measured to be 20% or less. Accordingly, use of the fixing member 250 of the example embodiment can resolve the above indicated problems.

Meanwhile, as previously described, the core layer 251 is provided to limit the elongation percentage of the fixing member 250. Accordingly, there is no need that the core layer 251 be thick as long as the core layer 251 has such functions. For example, a thickness of the core layer 251 may be defined to be in the range of 10 µm to 50 µm, but is not limited thereto.

The fixing member 250 of the example embodiment is formed such that the adhesive layer 253 is thicker than the core layer 251. For example, a thickness of each adhesive layer 253 may be twice greater than that of a fixing sheet. For example, each adhesive layer 253 may be defined to have a width of 50 µm to 120 µm, but is not limited thereto.

Further, a width W1 of the fixing member 250 is formed to be smaller than a width W2 of an external sealing portion (2022b of FIG. 7). The width W2 of the external sealing portion 2022b is formed to be smaller than a width of the side surface 204a of the accommodation portion 204. Accordingly, an entirety of one surface of the fixing member 250 is adhered to the sealing portion 2022b, and an entirety of the other surface is adhered to the side surface 204a of the accommodation portion 204. In addition, an entirety of the external sealing portion 2022b is disposed to face the side surface 204a of the accommodation portion 204, and thus does not extrude toward to outside of the side surface 204a of the accommodation portion 204.

For example, the fixing member 250 may be formed to have a width of 1 mm to 5 mm, but is not limited thereto.

Meanwhile, when the fixing member 250 has a width of less than 100 µm, the adhesive layer 253 is so thin that the adhesion thereof is deteriorated. In contrast, when the thickness of the fixing member 250 exceeds 300 µm, a distance between the sealing portion 202 and the accommodation portion 204 increases due to the thickness of the fixing member 250, thereby increasing a size of the battery cell. Accordingly, the thickness of the fixing member 250 in the example embodiment can be defined to be in the range of 100 µm to 300 µm.

A method for manufacturing a battery cell according to the example embodiment will now be described.

FIG. 5 is a diagram illustrating a method for manufacturing a battery cell according to the example embodiment.

Based on FIG. 5, an electrode assembly 100 is disposed inside an accommodation portion 204 of first and second cases 210 and 220, and an electrolyte is filled in an internal space of the accommodation portion followed by adhering and sealing a sealing portion 202 of the first case 210 and a sealing portion 202 of the second case 220.

In this case, a sheet including an aluminum thin film between insulating layers formed of insulating materials may be used as for the case 200. Alternately, the insulating layers may be formed of a polymer, such as nylon, PET, polypropylene, or the like, but is not limited thereto.

Next, a first folding process involving bending a second sealing portion 2022 at 180° along a first fold line C1. Hereinbelow, a portion disposed outside of the first fold line C1 is referred as an "external sealing portion 2022b" while that disposed inside the first fold line C1 is referred as an "internal sealing portion 2022a."

Figure 6:
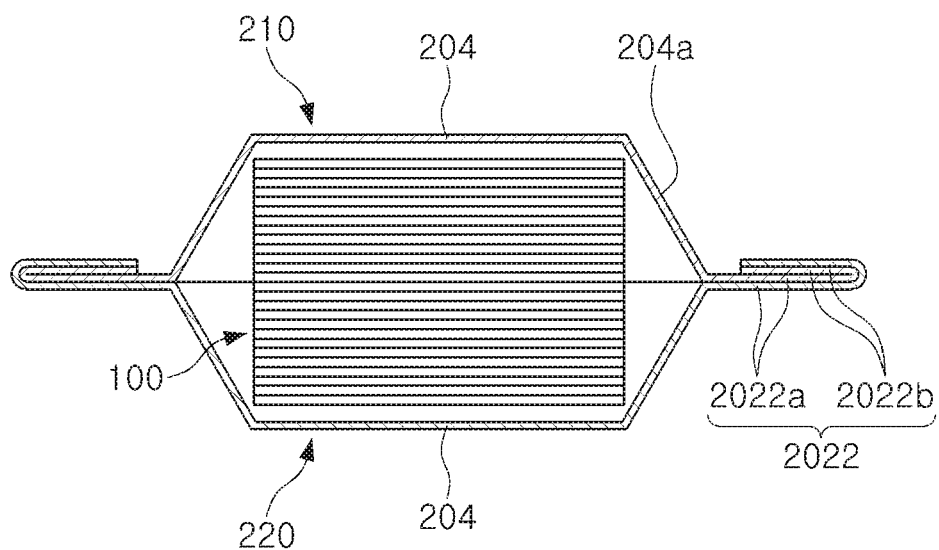

As illustrated in FIG. 6, the external sealing portion 2022b, overlapped with the internal sealing portion 2022a, is disposed in an upper portion of the internal sealing portion 2022a as the second sealing portion 2022 is being bent. In order to maintain the shape in which the external and internal sealing portions 2022b and 2022a overlap, heat may be applied while compressing the external and internal sealing portions 2022b and 2022a.

The first fold line C1 can be defined as a line dividing the second sealing portion 2022 in a longitudinal direction. The external and internal sealing portions 2022b and 2022a may be divided to have a same width, but are not limited thereto. As in the example embodiment, as long as an entirety of the external sealing portion 2022b can face the internal sealing portion 2022a, various modifications, including defining the first fold line C1 such that a width of the external sealing portion 2022b is smaller than that of the internal sealing portion 2022a, can be applied.

As illustrated in FIG. 7, a fixing member 250 is disposed in the external sealing portion 2022b disposed in the upper portion of the internal sealing portion 2022a.

The fixing member 250 is prepared to have a film or take form. As previously described, the adhesive layer 253 is formed of a PUR material when a surface of the case 200 is formed of a PET material.

Further, one surface of the fixing member 250 in surface contact with the external sealing portion 2022b has adhesiveness. In this regard, the fixing member 250 disposed in the external sealing portion 2022b is not easily separated in the external sealing portion 2022b. To this end, the fixing member 250 is provided as having a release liner attached to one surface thereof. In this process, the release liner may be attached to the external sealing portion 2022b after being controlled.

Meanwhile, a constant tension is applied to the fixing member 250 such that the fixing member 250 is attached to the external sealing portion 2022b evenly. During this process, the fixing member 250 may be elongated by the mentioned tension. The fixing member according to the example embodiment, however, includes a core layer as previously described, and thus has an elongation percentage of 20% or less and a tensile strength of 30 N/m$^2$. Accordingly, the fixing member 250 can be prevented from being excessively deformed or broken.

A second being process involving bending the second sealing portion 2022 along the second fold line C2 is carried out.

The second fold line C2 is formed at an interface between the accommodation portion 204 and the second sealing portion 2022 or adjacent to the interface.

Figure 8:
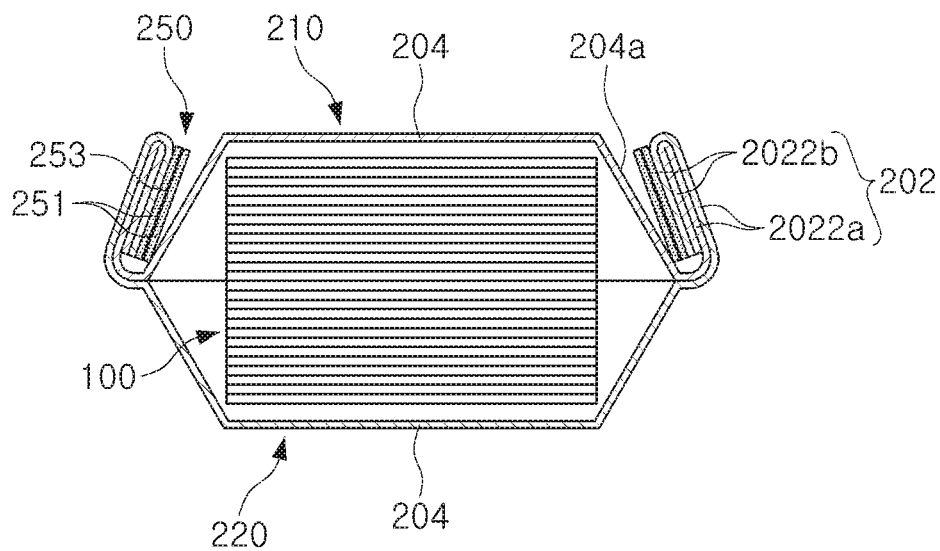

As illustrated in FIG. 8, the other surface of the fixing member 250 adhered to the external sealing portion 2022b is in surface contact with the side surface 204a of the accommodation portion as the sealing portion 202 is being bent, and the external and internal sealing portions 2022b and 2022a are disposed to overlap with the side surface 204a of the accommodation portion.

Figure 9:
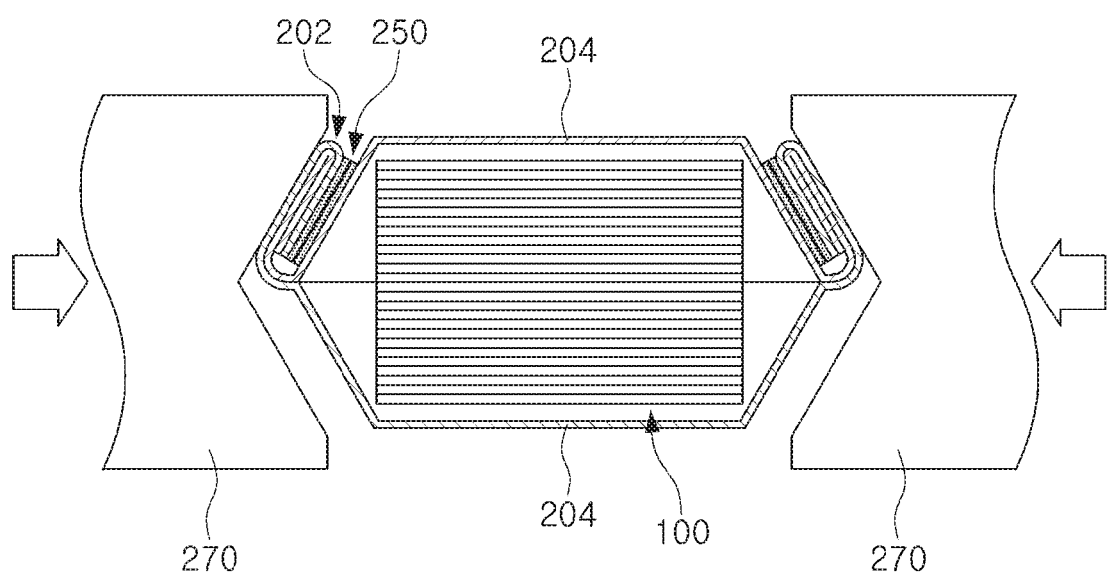

As illustrated in FIG. 9, the fixing member 250 is then thermocompressed from the outside of the sealing portion 202.

This process involves heat supply to a high temperature pressurizing apparatus 270 while pressurizing both sealing portion 202 and fixing member 250. During this process, 100° C. to 150° C. hat and 0.2 MPa to 1 MPa pressure are applied to the fixing member 250 for 5 sec to 30 sec, but the present invention is not limited thereto.

In this regard, the adhesive layer 253 of the fixing member 250 is melted and then hardened, while both surfaces of the fixing member 250 are adhered to the sealing portion 202 and the accommodation portion 204.

Once the sealing portion 202 is adhered to the side surface 204a of the accommodation portion via the fixing member 250 through the above processes, the battery cell according to the example embodiment is completed.

The battery cell and a manufacturing method thereof according to the example embodiment described above involve bending the sealing portion of the case and adhering the sealing portion to the accommodation portion. Accordingly, the electrolyte and gas can be prevented from being externally exposed from the sealing portion.

In addition, the fixing member in which adhesive layers are disposed on both surfaces thereof is used to adhere the sealing portion and the accommodation portion. Accordingly, a deformation of the fixing member can be minimized when attached to the sealing portion, and excessive diffusion of the melted adhesive layer can be prevented during the thermocompression. In this regard, adhesion reliability of the sealing portion and the accommodation portion can be improved, and defects, which may occur during the manufacturing of the battery cell, can be prevented.

While example embodiments have been shown and described above, it will be apparent to those skilled in the art that modifications and variations could be made without departing from the scope of the present invention, as defined by the appended claims.

For example, in the previously described example embodiment, the second sealing portion is exemplified as being bent twice, but the present invention is not limited thereto. The second sealing portion may be bent once or three times or more, thereby being subject to various modifications if necessary.

Further, in the previously described example embodiment, the fixing member is formed to have a continuous linear shape, but may be configured to have a waveform by spacing a plurality of short fixing members apart from each other.

In addition, a fixing member is disposed only between the sealing portion and the accommodation portion in the example embodiment; however, a fixing member can be disposed between the external and internal sealing portions if necessary.

The invention claimed is:

1. A battery cell, comprising:
   an electrode assembly;
   a case comprising an accommodation portion accommodating the electrode assembly and a sealing portion formed on a periphery of the accommodation portion; and
   a fixing member disposed between the accommodation portion and the sealing portion to adhere each other;
   wherein the fixing member comprises a core layer, and an adhesive layer is stacked on both surfaces of the core layer,
   wherein the core layer is formed of a material having a lower elongation percentage compared to the adhesive layer,
   wherein a thickness of the fixing member is formed to be 100 μm to 300 μm, and a thickness of the adhesive layer is formed to be at least twice greater than a thickness of the core layer, wherein the fixing member is melted at 100° C. to 150° C., wherein the fixing member has an elongation percentage of 20% or less, and wherein the fixing member has a tensile strength of 30 N/m² to 45 N/m².

2. The battery cell of claim 1, wherein the sealing portion is bent at least once to be adhered to the accommodation portion.

3. The battery cell of claim 1, wherein the case is formed of a polyethylene terephthalate (PET), and the adhesive layer is formed of a polyurethane-based resin.

4. The battery cell of claim 3, wherein the core layer is formed of PET.

\* \* \* \* \*